(12) United States Patent
Rozsi et al.

(10) Patent No.: US 10,611,358 B2
(45) Date of Patent: Apr. 7, 2020

(54) CONTROL SYSTEM FOR LOW SPEED POSITIONING AND PACING FOR ON/OFF HIGHWAY VEHICLES

(71) Applicant: Eaton Corporation, Cleveland, OH (US)

(72) Inventors: Donald Rozsi, Marshall, MI (US); Jon Steeby, Schoolcraft, MI (US); Kenneth Rocker, Kalamazoo, MI (US); Matthew Starks, Burlington, MI (US); Nathan H. Cox, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 206 days.

(21) Appl. No.: 15/812,323

(22) Filed: Nov. 14, 2017

(65) Prior Publication Data
US 2018/0065614 A1 Mar. 8, 2018

Related U.S. Application Data

(63) Continuation of application No. PCT/US2016/032406, filed on May 13, 2016.
(Continued)

(51) Int. Cl.
*B60W 10/06* (2006.01)
*B60W 50/08* (2020.01)
(Continued)

(52) U.S. Cl.
CPC ............ *B60W 10/02* (2013.01); *B60W 10/06* (2013.01); *B60W 30/18063* (2013.01);
(Continued)

(58) Field of Classification Search
CPC . B60W 2510/0604; B60W 2510/0609; B60W 10/02; B60W 50/082;
(Continued)

(56) References Cited

U.S. PATENT DOCUMENTS 5,403,249 A 4/1995 Slicker
5,681,242 A * 10/1997 Bates .................... B60W 10/02
477/180

(Continued)

OTHER PUBLICATIONS

International Search Report and Written Opinion for International Application No. PCT/US2016/032406 dated Aug. 19, 2016, 12 pages.

*Primary Examiner* — Jacob S. Scott
*Assistant Examiner* — Lillian T Nguyen
(74) *Attorney, Agent, or Firm* — RMCK Law Group PLC

(57) ABSTRACT

A control method for operating an automated manual transmission system having a fuel-controlled engine, a multiple-speed change-gear transmission and a clutch drivingly interposed between the engine and an input shaft of the transmission is provided. The control method determines a rate of throttle change of a throttle pedal. The clutch is engaged at a first clutch engagement rate based on the rate of throttle change being greater than a threshold. The clutch is engaged at a second clutch engagement rate in a blended pedal mode that is proportional to an amount of throttle percentage engagement based on the rate of throttle change being less than the threshold. The first and second clutch engagement rates are distinct.

20 Claims, 3 Drawing Sheets

Related U.S. Application Data

(60) Provisional application No. 62/279,984, filed on Jan. 18, 2016, provisional application No. 62/161,345, filed on May 14, 2015.

(51) Int. Cl.
*B60W 10/02* (2006.01)
*B60W 30/18* (2012.01)

(52) U.S. Cl.
CPC ..... *B60W 50/082* (2013.01); *B60W 2540/103* (2013.01); *B60W 2710/023* (2013.01)

(58) Field of Classification Search
CPC ........... B60W 30/18063; B60W 10/06; B60W 2710/023; B60W 2540/103; B60W 2710/025; B60W 2710/026
See application file for complete search history.

(56) References Cited

U.S. PATENT DOCUMENTS

| | | | |
|---|---|---|---|
| 6,206,803 B1 | 3/2001 | Baer et al. | |
| 6,461,273 B1 * | 10/2002 | Davis | F16H 3/12 477/124 |
| 6,491,603 B1 * | 12/2002 | Steeby | B60W 10/06 477/118 |
| 2006/0020384 A1 | 1/2006 | Smith et al. | |
| 2006/0247094 A1 | 11/2006 | Fowler et al. | |
| 2012/0296536 A1 | 11/2012 | Lee et al. | |

\* cited by examiner

CONTROL SYSTEM FOR LOW SPEED POSITIONING AND PACING FOR ON/OFF HIGHWAY VEHICLES

CROSS-REFERENCE TO RELATED APPLICATIONS

This application is a continuation of International Application No. PCT/US2016/032406 filed on May 13, 2016, which claims priority to U.S. Provisional Application Nos. 62/279,984 filed on Jan. 18, 2016, and 62/161,345 filed on May 14, 2015. The disclosures of both are incorporated by reference herein.

FIELD

The present disclosure relates generally to a control method and system for controlling the low speed positioning and pacing of a vehicle.

BACKGROUND

Automated mechanical transmission (AMT) systems for vehicle use are known in art. As is well known, an AMT includes a clutch and a collection of gears. The AMT performs gear shifts automatically. AMTs can be provided on large construction vehicles. In some examples it may be desirable for an operator of such a vehicle to incrementally move the vehicle a small distance. Sometimes it is difficult to accurately predict how the clutch and engine will react to a minimal throttle request. This unpredictability can be especially prevalent and undesirable with heavy construction vehicles.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A control method for operating an automated manual transmission system having a fuel-controlled engine, a multiple-speed change-gear transmission and a clutch drivingly interposed between the engine and an input shaft of the transmission is provided. The control method determines a rate of throttle change of a throttle pedal. The clutch is engaged at a first clutch engagement rate based on the rate of throttle change being greater than a threshold. The clutch is engaged at a second clutch engagement rate in a blended pedal mode that is proportional to an amount of throttle percentage engagement based on the rate being less than the threshold. The first and second clutch engagement rates are distinct.

According to additional features engaging the clutch at the first clutch engagement rate comprises engaging the clutch in a normal clutch mode wherein the clutch proceeds to a fully locked condition. Engaging the clutch at the second clutch engagement rate in the blended pedal mode comprises operating the clutch with partial slip. Engaging the clutch at the second clutch engagement rate further comprises controlling engine speed to idle.

According to other features control determines whether slip is experienced across the clutch and continues to engage the clutch at the second clutch engagement rate based on the determination that slip is occurring across the clutch. Control further determines whether a throttle pedal is engaged based on a determination that sip is not occurring across the clutch. Control exits the blended pedal mode based on the determination that slip is not occurring across the clutch and the determination that the throttle pedal is engaged. The clutch is engaged at the first clutch engagement rate subsequent to exiting the blended pedal mode. The clutch is continued to be operated at the second clutch engagement rate in the blended pedal mode based on the determination that the throttle pedal is not engaged. Engaging the clutch at the second clutch engagement rate in the blended pedal mode includes engaging the clutch proportional to a throttle pedal position.

A control method for operating an automated manual transmission system having a fuel-controlled engine, a multiple-speed change-gear transmission and a clutch drivingly interposed between the engine and an input shaft of the transmission according to additional features of the present disclosure is provided. A rate of throttle change of a throttle pedal is determined. The clutch is operated in a locked condition based on the rate of throttle change being greater than a threshold. The clutch is operated in a partial slip condition and a blended pedal mode that is proportional to an amount of throttle percentage engagement based on the rate being less than the threshold.

According to other features, operating the clutch in the locked condition comprises engaging the clutch at a first clutch engagement rate. Operating the clutch in a slip condition comprises engaging the clutch at a second clutch engagement rate in a blended pedal mode. Engaging the clutch at the second clutch engagement rate further comprises controlling engine speed to idle. Control further determines whether slip is experienced across the clutch and continues to engage the clutch at the second clutch engagement rate based on a determination that slip is occurring across the clutch. Control determines whether a throttle pedal is engaged based on a determination that slip is not occurring across the clutch.

According to further features, control exits the blended pedal mode based on the determination that slip is not occurring across the clutch and the determination that the throttle pedal is engaged. The clutch is engaged at a first clutch engagement rate. The clutch is continued to be operated at the second clutch engagement rate in a blended pedal mode based on a determination that the throttle pedal is not engaged. Engaging the clutch at the second clutch engagement rate in the blended pedal mode includes engaging the clutch proportional to a throttle pedal position.

A control method for operating an automated manual transmission system having a fuel-controlled engine, a multiple-speed change-gear transmission and a clutch drivingly interposed between the engine and an input shaft of the transmission according to additional features of the present disclosure is provided. A rate of throttle change of a throttle pedal is determined. The clutch is operated at a first clutch engagement rate toward a locked condition based on the rate of throttle change being greater than a threshold. The clutch is operated at a second clutch engagement based on the rate of throttle change being less than the threshold. The engine speed is controlled to idle based on the rate of throttle change being less than the threshold while concurrently moving a vehicle associated with the automated manual transmission system incrementally.

According to additional features, control determines whether slip is experienced across the clutch and continues to engage the clutch at the second clutch engagement rate based on a determination that slip is occurring across the clutch. Control determines whether a throttle pedal is engaged based on a determination that slip is not occurring across the clutch. The second clutch engagement rate is exited based on the determination that slip is not occurring across the clutch and the determination that the throttle pedal is engaged. The clutch is engaged at the first clutch engagement rate.

BRIEF DESCRIPTION OF THE DRAWINGS

The present disclosure will become more fully understood from the detailed description and the accompanying drawings, wherein.

DETAILED DESCRIPTION

As will become appreciated herein, the present disclosure provides a control system and method that allows a vehicle operator to more accurately position vehicles, such as construction vehicles at job sites and to improve pacing of other construction vehicles and implements. The present disclosure is directed toward a system and method implemented on an AMT.

Figure 1:
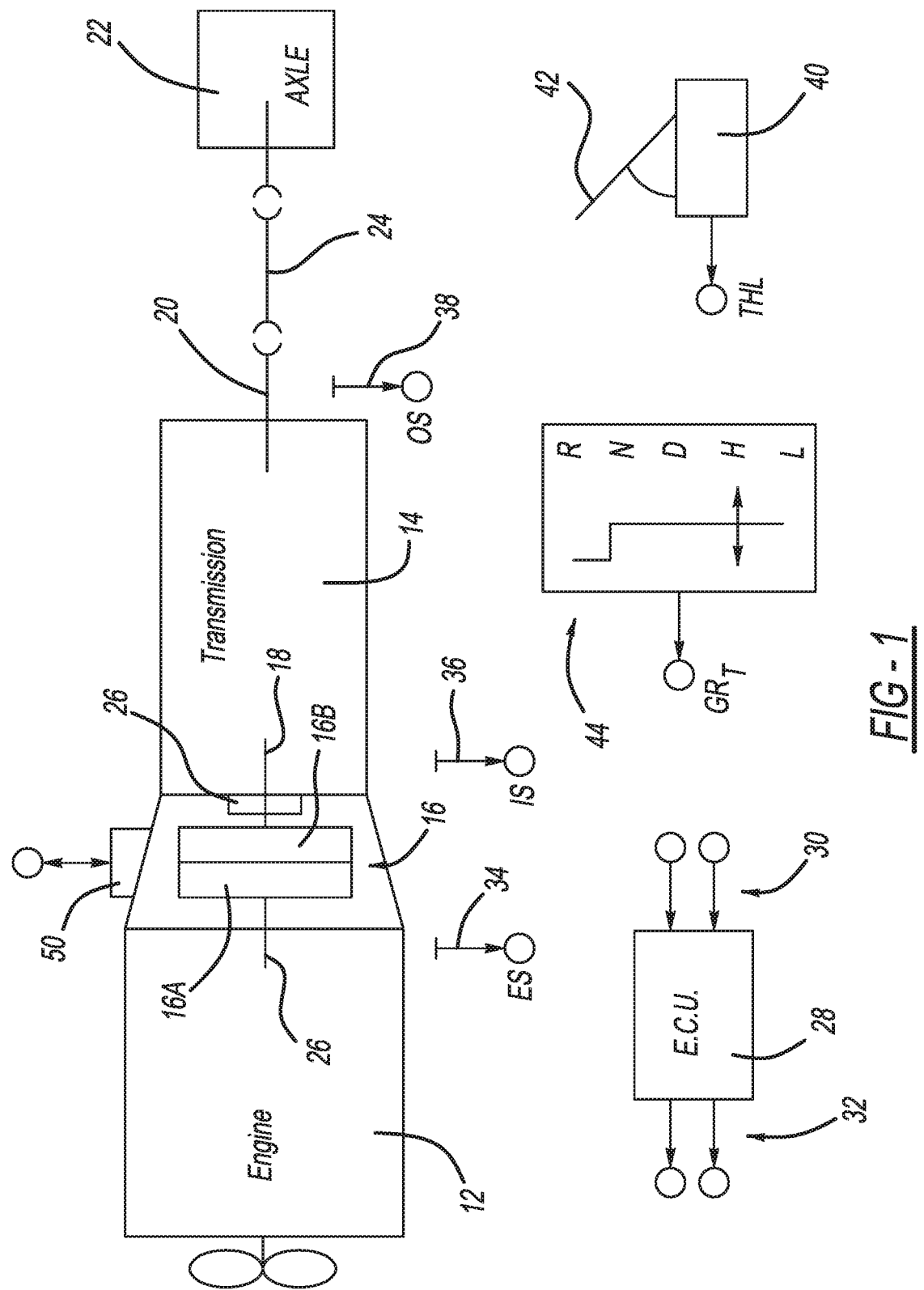
FIG. 1 is a schematic of an automated mechanical transmission system utilizing constructed in accordance to one example of the present disclosure and using the control described herein.

With initial reference to FIG. 1, an AMT system intended for vehicular use is schematically shown and referred to at reference 10. The AMT system 10 includes a fuel-controlled engine 12 (such as a diesel engine or the like), a multiple-speed, change-gear transmission 14 and a master clutch 16 drivingly interposed between the engine 12 and an input shaft 18 of the transmission 14. The transmission 14 may be of the compound type comprising a main transmission section connected in series with a splitter and/or range-type auxiliary section. Transmissions of this type, especially as used with heavy duty vehicles, typically have 9, 10, 12, 13, 16 or 18 forward speeds. A transmission output shaft 20 extends outwardly from the transmission 14 and is drivingly connected with vehicle drive axles 22, usually by means of a prop shaft 24. The master clutch 16 includes a driving portion 16A connected to an engine crankshaft/flywheel 26 and a driven portion 16B coupled to the transmission input shaft 18 and adapted to frictionally engage the driving portion 16A. An electronic control unit (ECU) 28 is provided for receiving input signals 30 and for processing same in accordance with predetermined logic rules to issue command output signals 32 to various system actuators and the like. The system 10 can also include a rotational speed sensor 34 for sensing rotational speed of the engine 12 and providing an output signal (ES) indicative thereof, a rotational speed sensor 36 for sensing the rotational speed of the input shaft 16 and providing an output signal (IS) indicative thereof, and a rotational speed sensor 38 for sensing the speed of the output shaft 20 and providing an output signal (OS) indicative thereof.

A sensor 40 may be provided for sensing a displacement of a throttle pedal 42 and providing an output signal (THL) indicative thereof. A shift control console 44 may be provided for allowing the operator to select an operating mode of the transmission system and for providing an output signal (GRT) indicative thereof. The master clutch 16 may be controlled by a clutch actuator 50 responding to output signals from the ECU 28.

According to the present disclosure, the system 10 provides the driver with two modes of clutch engagement, normal clutch engagement and blended pedal clutch engagement. As will be described, normal clutch engagement can be carried out to lock up the clutch 16 quickly to provide fast vehicle response. In general, normal clutch engagement is carried out during normal vehicle operation, for example travelling to a job site. Normal clutch engagement can be used while accelerating the vehicle from a stop at a reasonably quick rate (i.e. getting through intersections).

Blended pedal clutch engagement can be used for vehicle positioning along short distances. For example, blended pedal clutch engagement can be useful when it is desired to position the vehicle to a specific spot along a very short distance. By way of non-limiting example, blended pedal clutch engagement can be particularly useful for a cement mixer vehicle where it may be desired to move the vehicle incrementally a very small distance (six inches, one foot, etc.). In this regard, blended pedal clutch engagement can be used to maintain the clutch 16 to a specific amount of engagement (i.e. partial slip) to control vehicle speed at speeds less than is possible when the clutch is fully closed (pacing). As used herein the term "slip" denotes relative movement between the driven portion 16B and the driving portion 16A of the clutch 16.

Blended pedal clutch engagement can be used to control engine speed to idle. This is consistent with how a driver would drive a manual transmission by engaging the clutch without applying the throttle. The primary purpose of this is to maintain steady engine power take off (PTO) operation. For example a PTO may be controlling a mixer drum on a cement mixer vehicle and maintaining a steady flow of concrete at a job site while the vehicle is moving.

Figure 2:
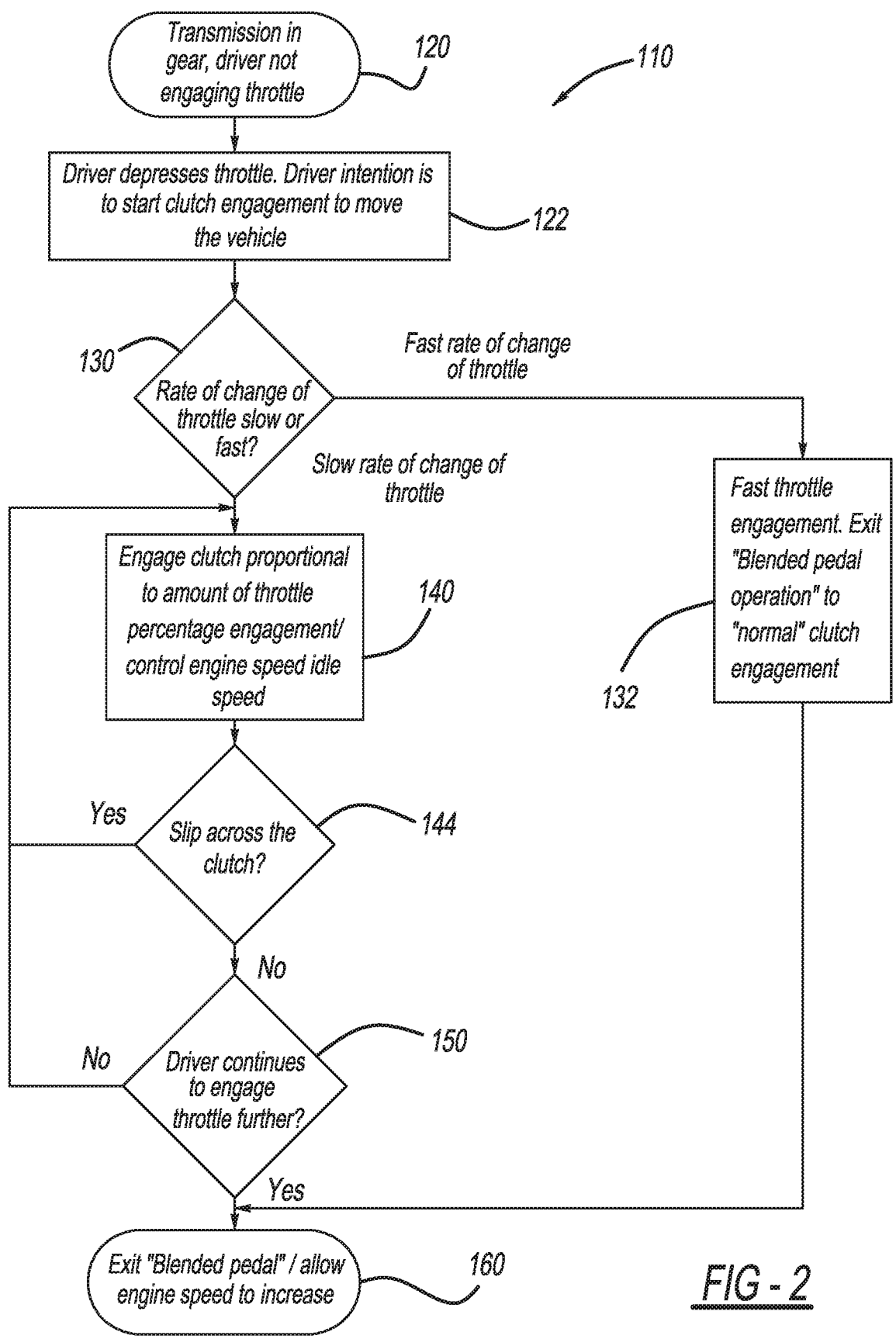
FIG. 2 is a schematic illustration of an exemplary control of the present disclosure.

Turning now to FIG. 2, an exemplary control method according to the present teachings is shown and generally identified at reference numeral 110. Control begins at 120 where the transmission 14 is in gear and the driver is not engaging the throttle 42. The driver depresses the throttle 42 at 122. Control determines whether the rate of change of the throttle pedal 42 is slow or fast at 130. It will be appreciated that the terms "slow" and "fast" may be calibrated according to a specific application. If control determines that the throttle pedal 42 has a fast rate of change, control proceeds to 132 where control operates the clutch 16 in normal clutch mode. It will be appreciated that in a normal clutch mode, the clutch 16 moves toward and attains a closed condition (no slip). Explained further, the clutch 16 locks up quickly to provide fast vehicle response.

If control determines that the throttle pedal 42 has a slow rate of change, control proceeds to 140 where control engages the clutch 16 proportional to the amount of throttle percentage engagement. The engine speed is controlled to the idle speed. In 144 control determines whether slip is experienced across the clutch 16. If the clutch 16 is slipping, the driver is intending to move the vehicle at a slow smooth speed to either position or to pace. If the clutch 16 is slipping, control loops to 140. If control determines that the clutch 16 is not slipping, control proceeds to 150. In 150 control determines whether the driver continues to engage the throttle pedal 42 further. If the clutch 16 stops slipping and the driver continues to engage the throttle pedal 42 further, the driver wants to exit "blended pedal" operation, fully engage the clutch 16 (lock up) and allow the engine 12, and therefore vehicle, to accelerate. If the driver does not continue to engage the throttle 42 further, control loops to 140. If the driver continues to engage the throttle 42, control proceeds to 160 where blended pedal mode is exited and the engine speed is allowed to increase.

By way of comparison, in systems according to a prior art example, a driver would slightly depress the throttle pedal and the engine speed would consequently be increased above idle. Then the clutch would be engaged to a predetermined position. For example, the predetermined position may be requested at 10% engagement. However it is not always the case that the requested position is reached. For example, sometimes the clutch may stick or the percentage may be off for other reasons. In any event, the requested position may not always be the realized position and in tight conditions where only minimal vehicle movement is wanted the relationship is undesirable.

Figure 3:
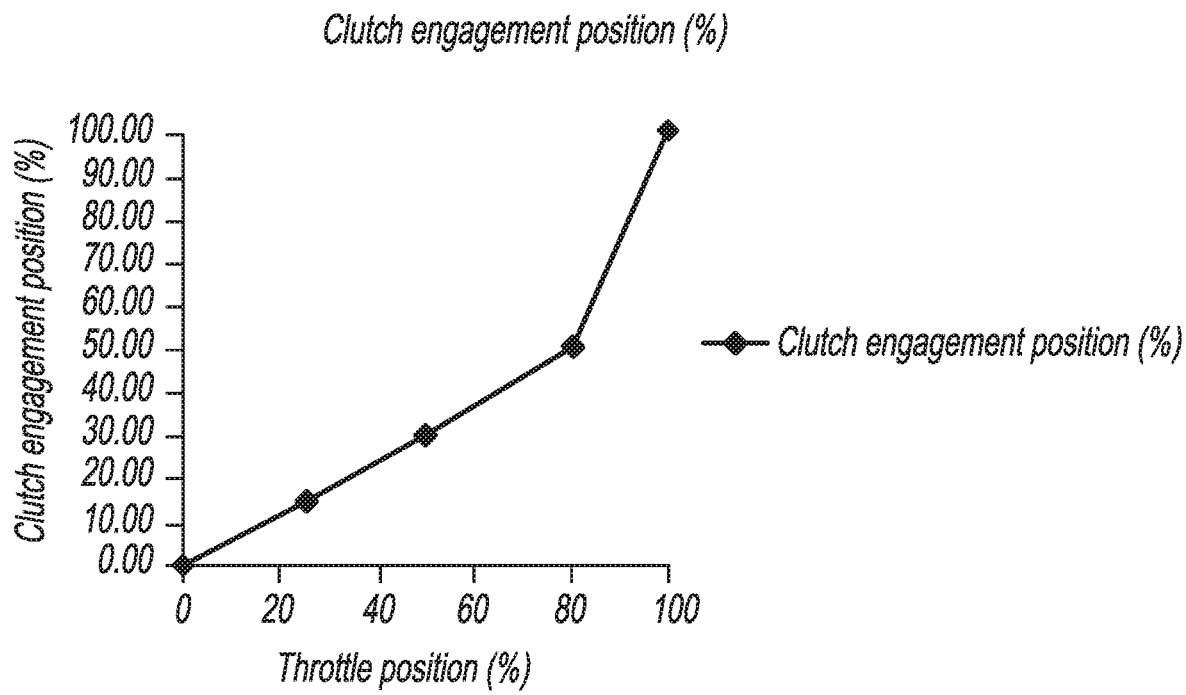
FIG. 3 is a plot illustrating clutch engagement position versus throttle position according to the present disclosure.
Figure 4:
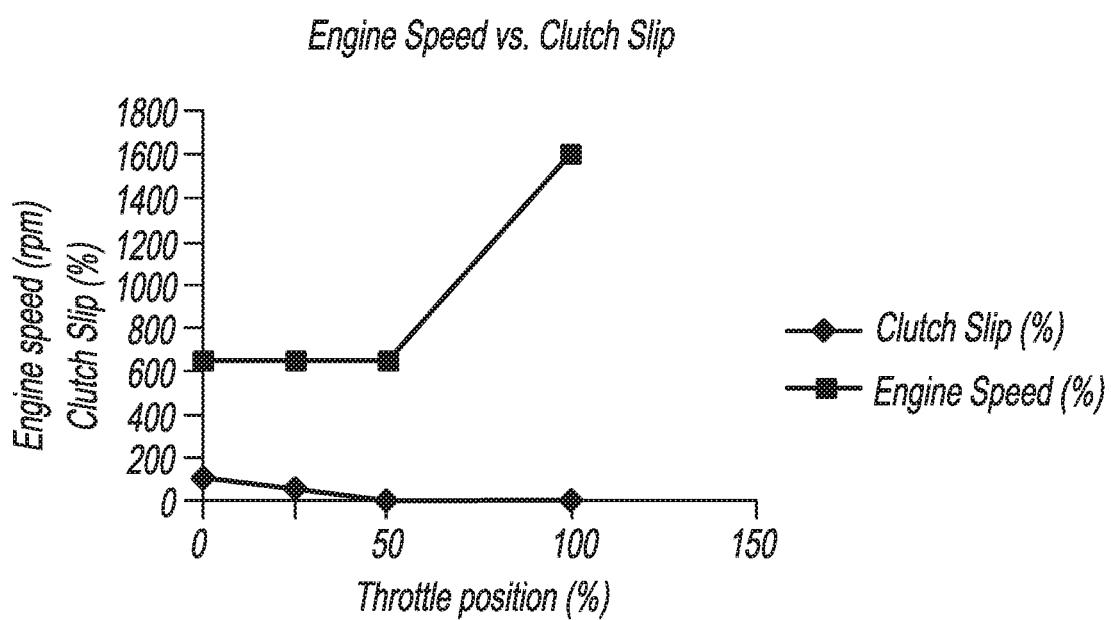
FIG. 4 is a plot illustrating engine speed versus clutch slip according to the present disclosure.

In the current disclosure, the control offers a blended pedal clutch engagement. In this way, the driver is in control. By being gentle on the throttle pedal 42, the driver can be in control of the engagement of the clutch 16 and therefore vehicle movement. If the driver experiences too much vehicle movement, the driver simply backs off the throttle pedal 42. In sum, prior art configurations required fixed position of partial clutch engagement. The present disclosure, with blended pedal clutch engagement, allows the driver to engage the clutch in proportion with the movement of the throttle pedal 42. FIGS. 3 and 4 illustrate exemplary plots according to the present disclosure.

In one advantage of the present disclosure, such a system 10 may be incorporated on a cement mixer vehicle. In a cement mixer vehicle, the cement drum operates by way of an engine driven PTO. The faster the engine speed goes, the faster the drum turns and the faster the concrete is poured. In this regard, it is desirable to maintain the concrete pour rate steady. With blended pedal clutch engagement, the engine can be held at idle speed so the engine is no longer triggered by the throttle pedal. In other words, control maintains the engine at idle so the driver can move the vehicle (in small distance increments) while the engine stays at idle speed and the drum spins the same and the concrete pours at the desired steady rate. In one example, the cement mixer vehicle operator may be pouring a curb and/or gutter while the vehicle is always moving while pouring. As a result, the driver desires to keep the engine at idle while slowly moving the vehicle.

An exemplary operating scenario will now be described. A vehicle is moving and with partial engagement of the clutch 16. The engine 12 is operating at idle. The clutch progressively moves toward a fully engaged position. At some point, the clutch 16 is going to be fully engaged (no slip). At the fully engaged position it is desirable to notify the driver that control will soon let the engine 12 increase its speed. By way of example, at 40% throttle pedal 42, the clutch 16 becomes fully engaged. Control can be configured to provide full engagement (no slip) between a range (such as between 40% and 60% throttle pedal 42. The driver can experience "dead pedal" in this range so the driver is not surprised when the engine 12 accelerates beyond idle. In this example, at 60% throttle, control is switched from the throttle pedal 42 to the engine 12 so the engine 12 is now free to accelerate. It is appreciated that other percentages may be used within the scope of the present disclosure.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A control method for operating an automated manual transmission system having a fuel-controlled engine, a multiple-speed change-gear transmission and a clutch drivingly interposed between the engine and an input shaft of the transmission, the control method comprising:
   determining a rate of throttle change of a throttle pedal;
   engaging the clutch at a first clutch engagement rate based on the rate of throttle change being greater than a threshold; and
   engaging the clutch at a second clutch engagement rate in a blended pedal mode that is proportional to an amount of throttle percentage engagement based on the rate of throttle change being less than the threshold, wherein the first and second clutch engagement rates are distinct.

2. The control method of claim 1 wherein engaging the clutch at the first clutch engagement rate comprises engaging the clutch in a normal clutch mode wherein the clutch proceeds to a fully locked condition.

3. The control method of claim 2 wherein engaging the clutch at the second clutch engagement rate in the blended pedal mode comprises operating the clutch with partial slip.

4. The control method of claim 3 wherein engaging the clutch at the second clutch engagement rate further comprises controlling engine speed to idle.

5. The control method of claim 3, further comprising:
   determining whether slip is experienced across the clutch and continuing to engage the clutch at the second clutch engagement rate based on a determination that slip is occurring across the clutch.

6. The control method of claim 5, further comprising:
   determining whether the throttle pedal is engaged based on a determination that slip is not occurring across the clutch.

7. The control method of claim 6, further comprising:
   exiting the blended pedal mode based on the determination that slip is not occurring across the clutch and the determination that the throttle pedal is engaged; and
   engaging the clutch at the first clutch engagement rate.

8. The control method of claim 6, further comprising:
   continuing to operate the clutch at the second clutch engagement rate in the blended pedal mode based on a determination that the throttle pedal is not engaged.

9. The control method of claim 8 wherein engaging the clutch at the second clutch engagement rate in the blended pedal mode includes engaging the clutch proportional to a throttle pedal position.

10. A control method for operating an automated manual transmission system having a fuel-controlled engine, a multiple-speed change-gear transmission and a clutch drivingly interposed between the engine and an input shaft of the transmission, the control method comprising:
    determining a rate of throttle change of a throttle pedal;
    operating the clutch in a locked condition based on the rate of throttle change being greater than a threshold; and operating the clutch in a partial slip condition and a blended pedal mode that is proportional to an amount of throttle percentage engagement based on the rate being less than the threshold.

11. The control method of claim 10 wherein operating the clutch in the locked condition comprises engaging the clutch at a first clutch engagement rate and wherein operating the clutch in a slip condition comprises engaging the clutch at a second clutch engagement rate in the blended pedal mode.

12. The control method of claim 11 wherein engaging the clutch at the second clutch engagement rate further comprises controlling engine speed to idle.

13. The control method of claim 12, further comprising: determining whether slip is experienced across the clutch and continuing to engage the clutch at the second clutch engagement rate based on a determination that slip is occurring across the clutch.

14. The control method of claim 13, further comprising: determining whether the throttle pedal is engaged based on a determination that slip is not occurring across the clutch.

15. The control method of claim 14, further comprising: exiting the blended pedal mode based on the determination that slip is not occurring across the clutch and the determination that the throttle pedal is engaged; and engaging the clutch at the first clutch engagement rate.

16. The control method of claim 14, further comprising: continuing to operate the clutch at the second clutch engagement rate in a blended pedal mode based on a determination that the throttle pedal is not engaged.

17. The control method of claim 11 wherein engaging the clutch at the second clutch engagement rate in the blended pedal mode includes engaging the clutch proportional to a throttle pedal position.

18. A control method for operating an automated manual transmission system having a fuel-controlled engine, a multiple-speed change-gear transmission and a clutch drivingly interposed between the engine and an input shaft of the transmission, the control method comprising:
   determining a rate of throttle change of a throttle pedal;
   operating the clutch at a first clutch engagement rate toward a locked condition based on the rate of throttle change being greater than a threshold; and
   operating the clutch at a second clutch engagement rate in a slip condition that is proportional to an amount of throttle percentage engagement based on the rate of throttle change being less than the threshold; and
   controlling engine speed to idle based on the rate of throttle change being less than the threshold while concurrently moving a vehicle associated with the automated manual transmission system incrementally.

19. The control method of claim 18, further comprising:
   determining whether slip is experienced across the clutch and continuing to engage the clutch at the second clutch engagement rate based on a determination that slip is occurring across the clutch; and
   determining whether the throttle pedal is engaged based on a determination that slip is not occurring across the clutch.

20. The control method of claim 19, further comprising:
   exiting the second clutch engagement rate based on the determination that slip is not occurring across the clutch and the determination that the throttle pedal is engaged; and
   engaging the clutch at the first clutch engagement rate.

* * * * *